United States Patent
Gerdau

(10) Patent No.: US 9,254,473 B2
(45) Date of Patent: Feb. 9, 2016

(54) SPUNBOND WEB FOR ADSORPTION OF PETROCHEMICAL SUBSTANCES FROM LIQUIDS GASES

(75) Inventor: Herbert Gerdau, Haltern am See (DE)

(73) Assignee: Vera Margraf-Gerdau, Haltern am See (DE)

(*) Notice: Subject to any disclaimer, the term of this patent is extended or adjusted under 35 U.S.C. 154(b) by 0 days.

(21) Appl. No.: 14/232,324

(22) PCT Filed: Jul. 13, 2012

(86) PCT No.: PCT/EP2012/063843
§ 371 (c)(1),
(2), (4) Date: Feb. 4, 2014

(87) PCT Pub. No.: WO2013/010960
PCT Pub. Date: Jan. 24, 2013

(65) Prior Publication Data
US 2014/0151289 A1      Jun. 5, 2014

(30) Foreign Application Priority Data

Jul. 15, 2011   (DE) .................. 10 2011 051 888

(51) Int. Cl.
*B01J 20/28*      (2006.01)
*B01J 20/32*      (2006.01)

(52) U.S. Cl.
CPC ............ *B01J 20/28* (2013.01); *B01J 20/28026* (2013.01); *B01J 20/28028* (2013.01); *B01J 20/28035* (2013.01); *B01J 20/3291* (2013.01); *Y10T 156/10* (2015.01)

(58) Field of Classification Search
CPC .................... B01J 20/28026; B01J 20/28035
USPC .......... 156/324; 428/403, 404, 407; 210/924, 210/693, 694
See application file for complete search history.

(56) References Cited

U.S. PATENT DOCUMENTS

| | | | | |
|---|---|---|---|---|
| 4,411,948 A * | 10/1983 | Ogino et al. | .................... | 442/58 |
| 4,964,509 A * | 10/1990 | Insley et al. | .................... | 206/204 |
| 5,161,686 A | 11/1992 | Weber | | |
| 5,205,973 A * | 4/1993 | Kafka | .......... | 264/101 |
| 6,517,653 B2* | 2/2003 | Hahn | ............ | 156/123 |
| 2005/0165153 A1* | 7/2005 | Fusamae et al. | ............ | 524/493 |
| 2006/0005517 A1* | 1/2006 | Sundet et al. | .................. | 55/497 |
| 2009/0291043 A1* | 11/2009 | Bochaver | .................. | 423/449.7 |
| 2010/0076126 A1* | 3/2010 | Zimmer et al. | ............... | 524/109 |
| 2010/0249254 A1* | 9/2010 | Fan et al. | .................... | 521/44.5 |
| 2013/0277880 A1* | 10/2013 | Dubois et al. | ................. | 264/165 |

FOREIGN PATENT DOCUMENTS

| | | | |
|---|---|---|---|
| CN | 201558618 U | * | 8/2010 |
| DE | 4134222 A | | 4/1993 |
| EP | 0587293 A | | 3/1994 |
| JP | 10-324118 A | * | 12/1998 |
| WO | 9811156 A | | 3/1998 |

\* cited by examiner

*Primary Examiner* — Chester Barry
(74) *Attorney, Agent, or Firm* — Andrew Wilford

(57) ABSTRACT

An adsorption web for adsorption of petrochemical substances from liquid phases or for adsorption of odorous substances has at least one face coated with a polymer. At least one adsorption substance present is in the polymer as a filler and has micropores or mesopores or macropores.

6 Claims, 1 Drawing Sheet

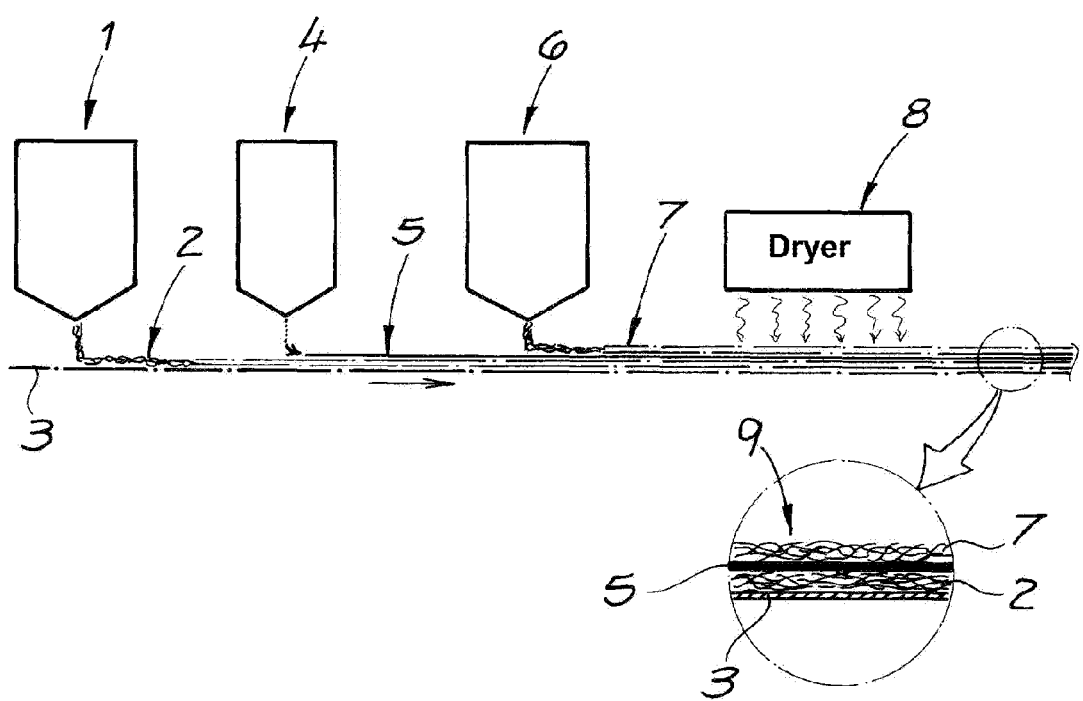

SPUNBOND WEB FOR ADSORPTION OF PETROCHEMICAL SUBSTANCES FROM LIQUIDS GASES

CROSS REFERENCE TO RELATED APPLICATIONS

This application is the US-national stage of PCT application PCT/2012/063843 filed 13 Jul. 2012 and claiming the priority of German patent application 102011051888.6 itself filed 15 Jul. 2011.

The invention relates to an adsorption web, in particular for adsorption of petrochemical substances from liquid phases and/or for adsorption of odorous substances from gas phases having at least one web. The invention further relates to a method for producing an adsorption web.

Means for adsorption of petrochemical substances are basically known in practice. The process of applying porous particles, for instance, and collecting them again after diffusion of the petrochemical substances into the pores of these particles has been proven successful. Even if the porous particles known in practice are characterized by their strong adsorption capacity, the process of collecting the particles laden with petrochemical substances has turned out to be critical. Fabrics impregnated in order to render them capable of selectively binding petrochemical substances are also known in practice. However, the process of impregnating is very costly, making these webs inaccessible for broad applications due to high manufacturing costs.

For this reason, the invention is based on the technical challenge of indicating an adsorption web characterized by ease of handling, easy production and economic utilization. The invention is further based on the technical challenge of indicating a method for producing this type of adsorption web.

For the purpose of solving the technical challenge the teaching of the invention is an adsorption web, in particular for adsorption of petrochemical substances from liquid phases and/or for adsorption of odorous substances from gas phases, comprising at least one web, wherein at least one face of the web is coated with a polymer, wherein at least one adsorption substance acting as a filler is present in the polymer, with said adsorption substance exhibiting micropores and/or mesopores and/or macropores. Within the context of the invention, petrochemical substances refer to petroleum and/or crude oil, products made of crude oil and/or oil products and organic chemical compounds. For practical purposes the adsorption web according to the invention is to render contamination, preferably organic compounds and/or water-insoluble compounds from liquid phases, such as landfill leachate adsorbable and/or removable. According to an embodiment, the invention allows for adsorption of undesirable substances from biogas plants and is recommended for use in decontaminating bodies of water polluted by radiation by means of incorporating radiating particles in the adsorption substance. Basically it is possible that cations from metal salt solutions and preferably heavy metal salt solutions can be absorbed by the inventive adsorption webs.

According to an embodiment, an inventive adsorption web is suitable for adsorption of odorous substances from the gas phase, such as of kerosene vapors and/or gasoline vapors and/or polychlorinated biphenyls (PCBs) from a gas phase or gas atmosphere. The preferred application of the inventive adsorption web is as a filter for separating odorous substances and/or pollutants from the cabin of an aircraft and/or a motor vehicle.

The material recommended for the web is a random fiber sheet that preferably comprises continuous filaments and/or staple fibers. As a rule it is possible for the spun bond to exhibit meltblown fibers. Preferably the fibers forming the web are made of a synthetic resin, such as polyolefin and preferentially of a polyethylene and/or polypropylene. Optionally, the fibers may be formed of a polyamide and/or polyester, such as polyethylene terephthalate. Preferably the synthetic resin used to produce the fibers is waste material. For practical purposes the web is developed in a single layer. In a further embodiment the web is developed having at least two or more layers.

In an embodiment that is particularly preferred the polymer incorporating the filler is bonded permanently or irreversibly to the fibers of the web. It is recommended that the polymer incorporating the filler is arranged between the web and covering web in a sandwich-like manner.

It is advantageous for the polymer to exhibit a filler ratio of 40 percent by weight to 98 percent by weight and preferably from 60 to 98 percent by weight. Embedding the porous filler in a hydrophobic polymer matrix has proven successful. According to an advantageous embodiment, the adsorption substance exhibits at least two porous fillers, wherein one filler is primarily comprised of mesopores and/or macropores and another filler primarily comprised of micropores. It is possible that the filler is upstream of the additional filler. Within the context of the invention the statement that the adsorption substance and/or filler exhibits micropores means the cross-section of the pore openings is less than 2 nm. Mesopores within the context of the invention means cross-sections of pore openings from 2 to 50 nm. Pores with an opening with a cross-section greater than 50 nm are referred to as macropores within the context of this invention. Adjusting the pore size of the filler to the application has proven successful.

It is recommended that the polymer be synthetic rubber. Synthetic rubber such as at least one from the following group can be used: "Styrene butadiene rubber (SBR), butyl acrylonitrile rubber, butyl rubber, butadiene rubber, isoprene rubber, ethylene propylene copolymer, ethylene propylene diene bead polymer, carboxylate rubber, epoxy rubber, trans-polypentenamer, halogenated butyl rubber, rubber from 2-chloro butadiene, ethylene vinyl acetate copolymer, epichlorohydrin, chemically modified natural rubber". It is possible to use natural rubber, such as natural latex as a polymer. In a preferred embodiment, it is possible to use waste materials from synthetic rubber production as synthetic rubber. Styrene butadiene rubber (SBR) is a particularly preferred type of synthetic rubber that preferably originates from production remnants (off-spec material) of SBR production, such as for car tires.

It is advantageous for the polymer to be bonded to the web. Coating the web with the filler-containing polymer in form of an emulsion has proven successful. In other words, the polymer is applied to the web in a partially dissolved form. In the process, the emulsion is formed of the polymer in which the filler is incorporated and of a liquid, such as water. For practical purposes the emulsified polymer penetrates surface irregularities of the web's fibers and once the liquid has been removed it will thus bond permanently and preferably irreversibly with the fibers. It is possible to apply the filler-containing polymer to the web in the form of powder or granules. It is recommended to cover the aggregate comprising the web and the applied, powdery polymer with the covering web so that the polymer is retained or fixed between the web and the covering web.

According to an advantageous embodiment the polymer exhibits a residual water content of 2 to 10 percent by weight and preferably of 3 to 8 percent by weight and especially preferred of 3 to 5 percent by weight.

It is advantageous for the adsorption substance to exhibit at least one component from the group "activated carbon, soot, zeolites, silicon compound, petroleum coke". Within the context of the invention, soot is also referred to as "carbon black". It is possible to re-treat a soot surface by way of artificial oxidation, if necessary. At least one type of soot from the group "furnace soot, gas black, lamp black" can be used as soot. Within the context of this invention, zeolites may be synthetic and/or natural zeolites. Advantageously, silicate and preferably aluminum silicate is used as silicon compound. According to one embodiment it is possible to use silicic acid and preferably pyrogenic silicic acid as a silicon compound. For practical purposes the adsorption substances are selected with respect to their porosity to ensure that optimal adsorption of a fluid to be adsorbed is achieved in the event of a specified application of the inventive adsorption web. According to an advantageous embodiment the polymer consists of a filler essentially exhibiting mesopores and/or macropores from the group "silicon compound, zeolites, soot, petroleum coke" which in its particularly preferred form is upstream of activated carbon exhibiting primarily micropores. Within the context of this invention, this means that the polymer is comprised of a filler from the group "silicon compound, zeolites, soot, petroleum coke" and activated carbon. This is a reliable way to prevent blocking the pores of the activated carbon with larger molecules and/or molecule chains and deactivating the active carbon with respect to its adsorption capability.

It is recommended that at least one auxiliary agent is present in the polymer, with at least one pigment, preferably a white pigment usable as the auxiliary agent. Materials such as titanium oxide or aluminum oxide may be used as white pigment. The auxiliary agent is arranged in the polymer so as to hide any colored or black adsorption substance from visibility by using the auxiliary agent as a cover. In other words, the appearance of a polymer exhibiting the auxiliary agent is determined by the auxiliary agent added. This prevents adsorption webs comprising active carbon and/or soot and/or petroleum coke from exhibiting a disadvantageously dark or black color.

It is recommended that the web and/or polymer exhibit buoyancy elements or buoyancy solids so that according to an advantageous embodiment the density of the inventive adsorption web is lower than the density of water, for instance. This will prevent an adsorption web from sinking below the water surface even in heavy swells when used to clean water after an accident involving oil or as an oil barrier on water, for example. This will ensure that the adsorption web always comes in contact with the oil floating on the water surface and as a result the floating oil is adsorbed by the polymer's filler. According to an advantageous embodiment the buoyancy elements consist primarily of plastic foam and particularly preferably of a polystyrene. For practical purposes the foam plastic exhibits a density of 0.015 kg/l to 0.05 kg/l, preferably of 0.02 kg/l to 0.04 kg/l and particularly preferably of approx. 0.03 kg/l. Advantageously, the polystyrene is incorporated in the web and/or polymer in the form of granules. It is recommended that the buoyancy elements in a sandwich-type adsorption web exhibiting a web and a covering web are arranged between the web and the covering web.

The teachings of the invention further include a method for producing an adsorption web, wherein a web is provided with at least one face of the web coated with a preferably aqueous emulsion, where in the emulsion at least one adsorption substance is present as a filler, wherein the web coated with the emulsion is dried so that the polymer bonds with and/or adheres to the filler and the polymer is fixed to the web. For practical purposes the web is obtained by depositing clusters of spunbond threads or filaments on a screen conveyor. It is further possible to create the web by depositing meltblown filaments. According to an alternative embodiment, the web is produced by carding. It is possible that the web is provided by unwinding the web from a roll.

The recommended method of obtaining the emulsion is to emulsify the polymer with a fluid, preferably water, into a polymer emulsion. Within the context of the invention, the polymer emulsion exhibits a polymer ratio preferably of 10 to 30 percent by weight and advantageously of approx. 25 percent by weight and a water ratio of 70 to 90 percent by weight for practical purposes and preferably of approx. 75 percent by weight. It is recommended to add the filler to the polymer emulsion so that an emulsion exhibiting a filler ratio of 60 to 90 percent by weight is obtained. In accordance with one embodiment, the emulsion exhibits a polymer content of up to 25 percent by weight. Advantageously the emulsion contains water in the amount of approx. 5 to 40 percent by weight and preferably 10 to 20 percent by weight. Basically it is possible to add buoyancy elements, preferably polystyrene in form of granules, to the emulsion. A particularly preferred buoyancy element is a lipophilic substance used to additionally increase the adsorption capability of the adsorption web. In other words, the preferably lipophilic buoyancy elements, for example, will render an organic compound capable of being adsorbed.

According to a preferred embodiment of the inventive method, it is recommended to coat only one face of the web at least partially and advantageously completely or essentially completely with the emulsion. It is possible to coat both web faces at least partially with the emulsion and recommended that they are covered completely or essentially completely with said emulsion. For practical purposes the viscosity of the emulsion is set so that the emulsion is capable of flowing and/or being pumped.

After applying the emulsion to the web, it is recommended to dry the web by heating so that the polymer's residual water content is reduced to 2 to 10 percent by weight, for example, preferably to 2 to 8 percent by weight and particularly preferably to 3 to 5 percent by weight. Maximum temperature settings of 180° C. during drying have proven successful. It is recommended to set drying temperatures so that the web's fiber structure is retained or not destroyed. According to an embodiment, the polymer-coated web is dried in a nitrogen atmosphere.

In an alternative embodiment, soluble salt is added to the emulsion so that the polymer comprising the filler and any buoyancy elements are precipitated from the emulsion in form of polymer granulate or polymer powder. Once separated from the fluid, the polymer powder is dried and applied to the web, covering said web at least partially and preferably completely or essentially completely. It is possible for the polymer comprising the filler to be arranged only on one face of the web. In another embodiment the polymer comprising the filler is applied to both faces of the web, i.e. the topside and bottom side.

According to a preferred embodiment, the polymer-coated face(s) of the web is/are covered with at least one covering web each, with the covering web bonded to the web and/or polymer. The web and covering web form the quasi bottom and covering with the polymer comprising the filler sandwiched in-between. Advantageously, the covering web is bonded irreversibly to the web and/or polymer in the process. According to an embodiment, the covering web is obtained or created by turning over or folding the web. Within the context of the invention the web and covering web are developed identically or essentially identically. It is basically possible that the web and covering web are developed to be different or discrete.

The invention is based on the insight that due to its special sustainability an inventive adsorption web is particularly suitable for applications aimed at cleaning or decontaminating water. The important aspect is that, surprisingly, use of materials left over from a production process is sufficient to ensure optimal function of an inventive adsorption web. In this regard, the inventive adsorption web is characterized by particular sustainability and efficiency. Due to the particular efficiency of its production process, the inventive web is suitable for a broad range of applications without the threat of any unforeseeable cost development when using this type of adsorption web. In this context it is important to point out that covering a large area with the inventive adsorption web is a simple process as is retrieving or securing the adsorption web once laden with pollutants.

The invention is further based on the insight that the inventive adsorption web is just as superbly suitable for cleaning gaseous media, such as breathing air in aircraft cabins. In this context the large inner surface of activated carbon (>1000 $m^2/g$) should be of particular note because it ensures reliable adsorption of gasoline vapors from the breathing air. The combination of various fillers allows for further optimization of adsorption of pollutants, particularly from breathing air in motor vehicle and/or aircraft cabins. In this context the invention is based on the insight that an inventive adsorption web can be completely or essentially completely regenerated. In other words, it is possible to undertake controlled desorption of adsorbed pollutants which upon desorption can be incinerated. Due to the ability to adjust the appearance of an inventive adsorption web it is especially suited for applications where the optical appearance denotes a particular meaning. An inventive adsorption web, for instance, may be arranged in an air filter system similar to a pleated filter, exhibiting an attractive, uniform white surface.

The invention is further based on the insight that an inventive adsorption web can be produced without any problems using the inventive method. The essential aspect of the inventive method is ease of application of the emulsion comprising the polymer that can be pumped or spread onto the web. For this reason, there is no need for costly impregnation. Advantageously, the inventive application of the emulsion and subsequent drying ensure creation of a close connection between the web's fibers and the polymer, alleviating the threat of the polymer separating from the web during the application. It is further essential that, as a result of the web and any additional covering web, the mechanical properties of the adsorption web can be adapted to the respective applications reliably and without problems.

FIG. 1 is a schematic representation of the method for producing the inventive spun bond.

In the following, the invention is explained in more detail by means of a drawing representing only one example of the embodiment. The FIGURE, FIG. 1, is a schematic representation of the method for producing the inventive spun bond.

According to the illustrated schematic method, a spun bond 2 is deposited onto a conveyor device 3 from a first web-dispensing station 1. A coating device 4 is used for even application of an emulsion 5 comprising a polymer and a filler onto the web 2. In the second web-dispensing station 6, an aggregate of the web 2 and emulsion 5 is covered with a covering web 7, thereby developing a three-layer aggregate. Subsequently, the three-layer aggregate comprising the emulsion still exhibiting a high water content is moved to a drying station 8, wherein the three-layer aggregate is dried for the purpose of developing the three-layer adsorption web 9. As a result of the drying process in drying station 8, the emulsion comprising the polymer is irreversibly bonded to the web 2 and covering web 7, which is illustrated in the enlarged detail of the FIGURE.

The invention claimed is:

1. A mat for adsorption of petrochemical substances from water, the mat comprising:
    a porous base web of continuous polymer filaments and having at least one face;
    a layer of a polymer containing soot as a filler irreversibly coated on the one face, the soot having micropores or mesopores or macropores;
    a porous cover web of continuous filaments bonded over the polymer/soot layer to the one face; and
    buoyancy elements or solids between the base web and cover web and imparting to the mat a lesser density than that of water.

2. The adsorbent mat defined in claim 1, wherein the polymer is synthetic rubber.

3. The adsorbent mat defined in claim 2, wherein waste materials from synthetic rubber production are used as the synthetic rubber.

4. The adsorbent mat defined in claim 2, wherein the synthetic rubber is styrene butadiene rubber.

5. The adsorbent mat defined in claim 1, wherein the polymer has a residual water content of 2 to 10 percent by weight.

6. The adsorbent mat defined in claim 1, further comprising:
    at least one white pigment in the polymer.

* * * * *